(12) United States Patent
Kikuchi

(10) Patent No.: US 6,842,152 B2
(45) Date of Patent: Jan. 11, 2005

(54) METHOD FOR ADJUSTING DETECTION AXIS OF OBJECT DETECTION SYSTEM

(75) Inventor: Hayato Kikuchi, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 35 days.

(21) Appl. No.: 10/452,901

(22) Filed: Jun. 3, 2003

(65) Prior Publication Data

US 2004/0017308 A1 Jan. 29, 2004

(30) Foreign Application Priority Data

Jun. 4, 2002 (JP) ..................... 2002-162968

(51) Int. Cl.⁷ ................... H01Q 1/32; G01S 7/40
(52) U.S. Cl. .............. 343/713; 343/878; 342/74; 342/70
(58) Field of Search .................. 343/713, 878, 343/757, 880; 342/74, 70, 75, 77, 174; H01Q 1/32; G01S 7/40

(56) References Cited

U.S. PATENT DOCUMENTS

2002/0066193 A1 * 6/2002 Hodge ..................... 33/293

2003/0042304 A1 * 3/2003 Knowles et al. ............ 235/384
2003/0151541 A1 * 8/2003 Oswald et al. ............. 342/70

FOREIGN PATENT DOCUMENTS

JP 11-326495 11/1999

* cited by examiner

Primary Examiner—Hoanganh Le
(74) Attorney, Agent, or Firm—Arent Fox PLLC

(57) ABSTRACT

A method for adjusting a detection axis of an object detection system, wherein a disk-shaped adjusting member is fixed to a reference plane on an outer face of a casing, wherein the rotational position of the adjusting member is adjusted. The adjusting member has first and second base surfaces, between which a wedge shape is formed. Rotating the adjusting member finely adjusts the angle of the second base surface relative to the reference plane of the casing thereby resulting in the direction of the second base surface coinciding with the direction of an object detection axis of a radar mechanism part fixed within the casing. The direction of the object detection axis can be adjusted in the horizontal direction by placing a level on the second base surface of the adjusting member and adjusting the mounting angle of the casing so the level indicates a horizontal direction.

11 Claims, 23 Drawing Sheets

FIG.3
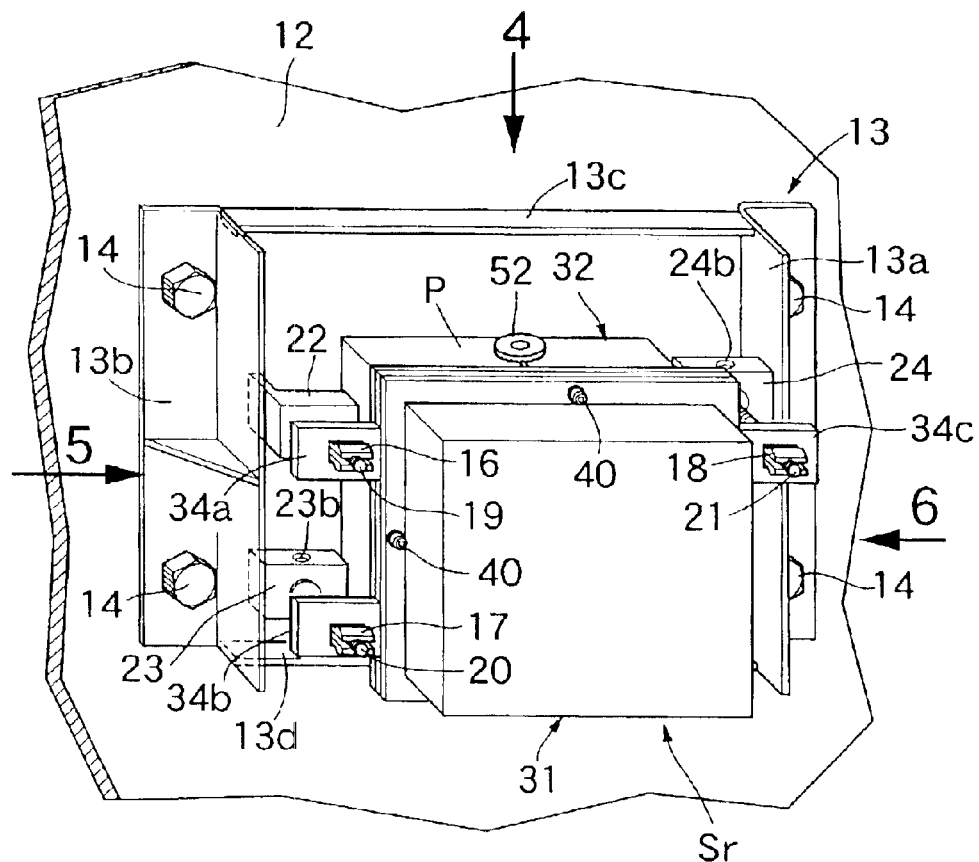
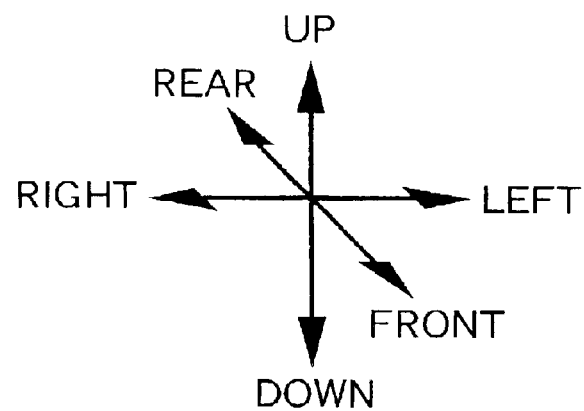

METHOD FOR ADJUSTING DETECTION AXIS OF OBJECT DETECTION SYSTEM

BACKGROUND OF THE INVENTION

1. Field of the Invention

The present invention relates to a method for adjusting a detection axis of an object detection system in which an object detection means has a predetermined detection direction and is fixed within a casing having a reference plane on an outer face thereof.

2. Related Art

When mounting a radar system in a vehicle having an ACC system (i.e., Adaptive Cruise Control system), a Stop & Go system (i.e., congested traffic tracking system), an intervehicular warning system, and the like, if the direction of an object detection axis of the radar system is not properly aligned with the direction of a preset target object detection axis, the radar system will suffer from several disadvantages. For example, the radar system can malfunction and erroneously detect an oncoming vehicle in an adjacent lane, or the radar system does not operate and essentially detects only a road surface, an overpass, or a signboard without detecting a preceding vehicle. It is therefore necessary to ensure the direction of the object detection axis of the radar system is aligned with the direction of the target object detection axis.

Japanese Patent Application Laid-open No. 11-326495 discloses an arrangement wherein to perform accurate vertical aiming of the radar system object detection axis, the angle of an antenna mounted on a vehicle body is measured by a level and adjusted to maintain the correct vertical angle.

When aiming is performed by measuring the mounting angle of a radar system casing relative to a vehicle body using a level or the like, the object detection axis of a radar mechanism part installed within the casing must have a fixed relationship with the casing. However, due to errors during assembly, variations in the direction of the object detection axis are generated in the assembled radar systems. Furthermore, even by correctly adjusting the mounting angle of the casing on the vehicle body, the variations undesirably result in the direction of the object detection axis being misaligned with the target object detection axis.

SUMMARY OF THE INVENTION

It is an object of the present invention to overcome the above-described drawbacks in the related art.

It is also an object of the present invention to compensate for variations in the direction of a radar system object detection axis relative to the casing, thereby enabling accurate alignment.

In order to achieve these objects, in accordance with a first aspect of the invention, there is a method for adjusting a detection axis of an object detection system in which an object detection means having a predetermined detection direction is fixed within a casing having a reference plane on the outer face thereof. The method includes a first step of detecting an angular difference between the predetermined detection direction and an object detection axis of the object detection means in an initially fixed state relative to the casing. In a second step, a adjusting member having a first base surface and a second base surface, between which a wedge shape is formed, is fixed to the casing and is mounted in rotationally different positions on the reference plane of the casing. The first base surface is used as a mounting surface and the adjusting member is fixed, based on the angular difference, at a rotational position. As a result, the direction of the second base surface coincides with the object detection axis in a state in which the adjusting member is mounted on the reference plane of the casing. In a third step, the angle of the casing is adjusted wherein the direction of the second base surface has a predetermined relationship with the predetermined detection direction.

In accordance with this arrangement, in the first step, the angular difference between the predetermined detection direction and the object detection axis of the object detection means is first detected when the object detection means is fixed to the interior of the casing. Subsequently, in the second step, the first base surface of the wedge-shaped adjusting member is mounted on the outer face of the casing to compensate for the angular difference. Accordingly, the direction of the second base surface of the adjusting member coincides with the object detection axis. In the third step, the angle of the casing is adjusted, wherein the direction of the second base surface of the adjusting member has a predetermined relationship with the predetermined detection direction. Therefore, the direction of the object detection axis of the object detection means coincides with the predetermined detection direction. Since the wedge-shaped adjusting member can be mounted in rotationally different positions on the reference plane of the casing, even when the angular difference between the object detection axis and the predetermined detection direction varies, the angular difference can be compensated for, thereby enhancing the precision in adjusting the object detection axis.

Furthermore, in accordance with a second aspect of the present invention, the adjusting member is disk-shaped and rotates freely around a mounting part provided in the middle thereof.

In accordance with this arrangement, since the disk-shaped adjusting member is rotated around the mounting part provided in the middle thereof, the direction of the second base surface of the adjusting member can be easily adjusted to coincide with the target detection axis.

Moreover, in accordance with a third aspect of the present invention, a latching part on the reference plane of the casing engages a part to be latched on the first base surface of the adjusting member to position the adjusting member in a predetermined rotational position.

In accordance with this arrangement, engaging the latching part on the reference plane of the casing with the part to be latched on the first base surface of the adjusting member enables the adjusting member to be reliably positioned in a predetermined rotational position. Accordingly, the direction of the second base surface coincides with the object detection axis.

Furthermore, in accordance with a fourth aspect of the present invention, a plurality of either one of or both of the latching part and the part to be latched is provided in order to allow the adjusting member to be positioned in a plurality of rotational positions.

In accordance with this arrangement, since a plurality of at least one of the latching part and the part to be latched is provided, the adjusting member can be positioned in a plurality of rotational positions, thereby making the direction of the second base surface coincide precisely with the object detection axis.

Moreover, in accordance with a fifth aspect of the present invention, a single one of either the latching part or the part to be latched is provided while a plurality of the other is provided in equal intervals in a circumferential direction around the mounting part of the adjusting member to allow the adjusting member to be positioned in a plurality of rotational positions.

In accordance with this arrangement, the adjusting member can be positioned in a plurality of rotational positions at equal intervals, wherein the direction of the second base surface coincides precisely with the object detection axis.

Furthermore, in accordance with a sixth aspect of the present invention, a single one of either the latching part or the part to be latched is provided while a plurality of the other is provided in unequal intervals in a circumferential direction around the mounting part of the adjusting member in order to allow the adjusting member to be positioned in a plurality of rotational positions. In accordance with this arrangement, the adjusting member can be positioned in a plurality of rotational positions at unequal intervals, wherein the direction of the second base surface coincides precisely with the object detection axis.

Moreover, in accordance with a seventh aspect of the present invention, the predetermined detection direction is the horizontal direction and the predetermined relationship is such that the direction of the second base surface coincides with the horizontal direction.

In accordance with this arrangement, since the direction of the second base surface of the adjusting member coincides with the horizontal direction by adjusting the angle of the casing, the object detection axis of the object detection means is adjusted to be horizontal.

Furthermore, in accordance with an eighth aspect of the present invention, the predetermined detection direction is the horizontal direction and the adjusting member integrally includes a level on the second base surface.

In accordance with this arrangement, if the angle of the casing is adjusted such that the level provided on the second base surface of the adjusting member indicates the horizontal direction, the object detection axis of the object detection means is adjusted to the horizontal direction. Moreover, since the level is provided integrally on the second base surface, the convenience increases.

Moreover, in accordance with a ninth aspect of the present invention, a spacer having a mounting surface and a reference plane, between which a wedge shape is formed, is fixed wherein the mounting surface abuts against an outer face of the casing to adjust the angle of the reference plane of the spacer relative to the object detection axis.

In accordance with this arrangement, since the wedge-shaped spacer is fixed wherein the mounting surface abuts against the outer face of the casing and the angle of the reference plane relative to the object detection axis is adjusted, even when the outer face of the casing is substantially inclined relative to the object detection axis, the angle of the reference plane relative to the object detection axis is reduced wherein the adjusting member properly adjusts the object detection axis.

Furthermore, in accordance with a tenth aspect of the present invention, the spacer and the adjusting member are disk-shaped and secured together to the outer face of the casing via mounting parts provided in the middle thereof.

In accordance with this arrangement, because the disk-shaped spacer and adjusting member are secured together by the mounting parts to the outer face of the casing, the number of parts is reduced compared to when the spacer and adjusting member are fixed separately.

In accordance with an eleventh aspect of the present invention, the mounting face of the spacer is interlocked with the outer face of the casing to position the mounting face in the rotational direction.

In accordance with this arrangement, since the mounting face of the spacer is interlocked with the outer face of the casing, the spacer can be positioned relative to the casing in the rotational direction.

A radar mechanism part 33 of embodiments corresponds to the object detection means of the present invention, a target object detection axis ArO of the embodiments corresponds to the predetermined detection direction of the present invention, and bolt holes 52*a* and 56*b* of the embodiments correspond to the mounting part of the present invention.

A manner for carrying out the present invention is explained below by reference to embodiments of the present invention shown in the attached drawings.

BRIEF DESCRIPTION OF THE DRAWINGS

FIG. 3 is a perspective view of the radar system;

DETAILED DESCRIPTION OF PREFERRED EMBODIMENTS

Figure 1:
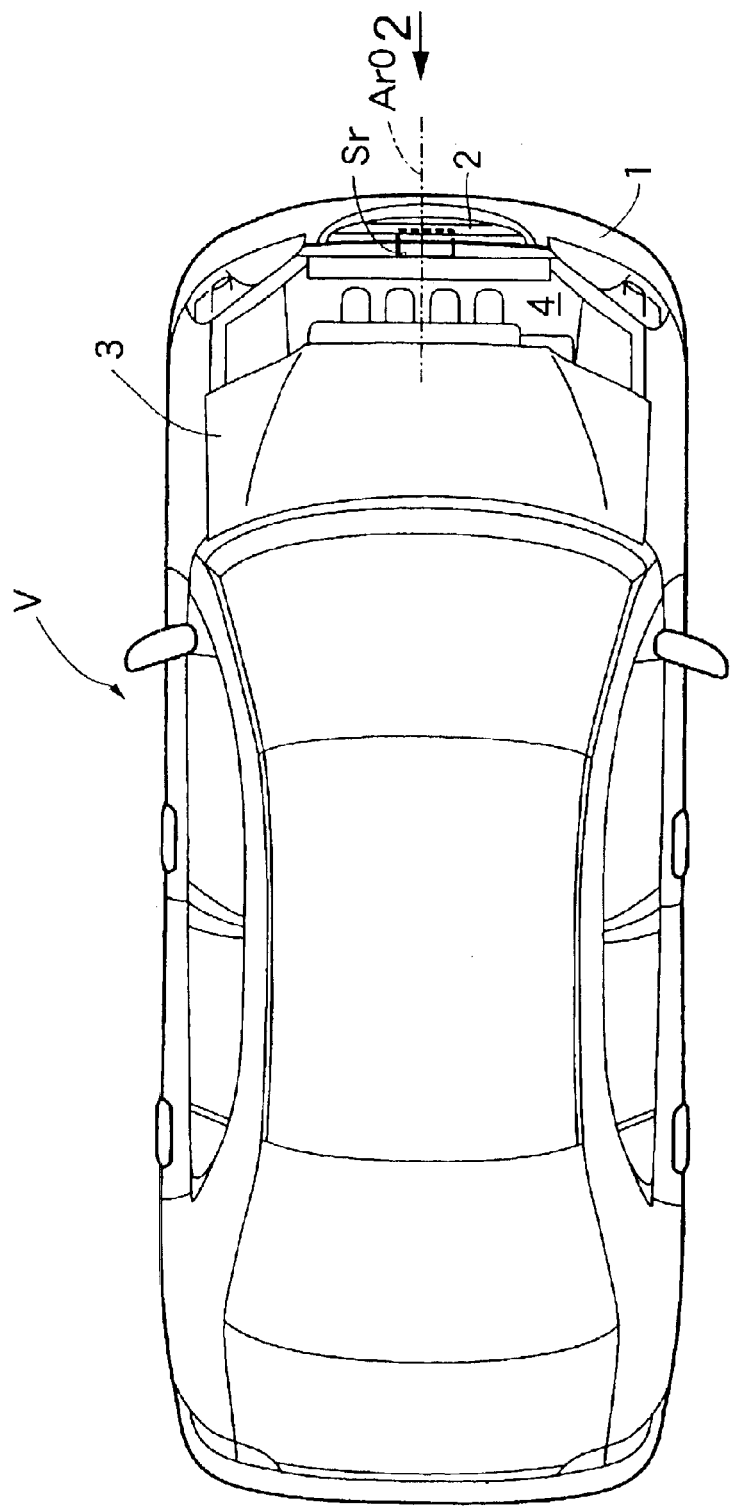
FIG. 1 is a top view of a vehicle equipped with a radar system.
Figure 2:
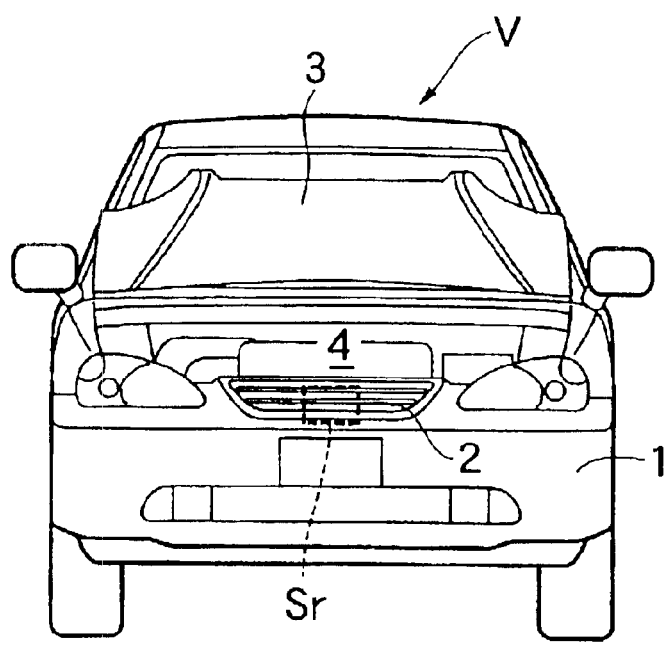
FIG. 2 is a view taken in the direction of arrow 2 in FIG. 1.

Referring to FIGS. 1 and 2, a radar system Sr that detects an object, such as a preceding vehicle present in the direction of travel of a vehicle V, is disposed in a front end part of an engine compartment 4, positioned rearward of a front grille 2 and fixed to an upper central part of a front bumper 1. The engine compartment 4 is opened and closed by a hood 3. The terms, 'front', 'rear', 'left', and 'right' as used in the present specification are based on an occupant sitting in a seat, and their definitions are shown in FIG. 3.

As shown in FIGS. 3 to 8, a bracket 13 supports the radar system Sr on a support plate 12. The bracket 13 is formed from left and right bracket main bodies 13a and 13b and upper and lower connecting members 13c and 13d. The connecting members 13c and 13d provide connections between upper and lower ends of the bracket main bodies 13a and 13b, which are formed by bending a metal plate so as to have an L-shaped cross section. Four corners of the bracket 13 are fixed to the support plate 12 via bolts 14. The radar system Sr includes a radome 31 and a casing 32. Synthetic resin nut members 16, 17, and 18 are supported on stays 34a, 34b, and 34c, respectively, which project between the radome 31 and the casing 32.

Figure 7:
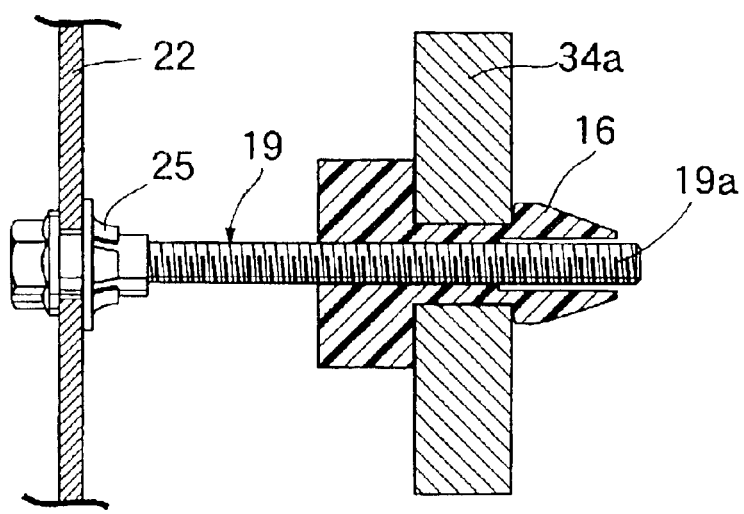
FIG. 7 is an enlarged cross-sectional view of part 7 in FIG. 5.

Bolt support members 22, 23, and 24 are fixed to the left and right bracket main bodies 13a and 13b at positions rearward of the corresponding stays 34a, 34b, and 34c. As shown in FIG. 7, the base end of a bolt member 19 passing through the bolt support member 22 positioned to the rear of the upper right stay 34a is axially fixed by a push nut 25. A male thread part 19a is screwed into the nut member 16.

Figure 8:
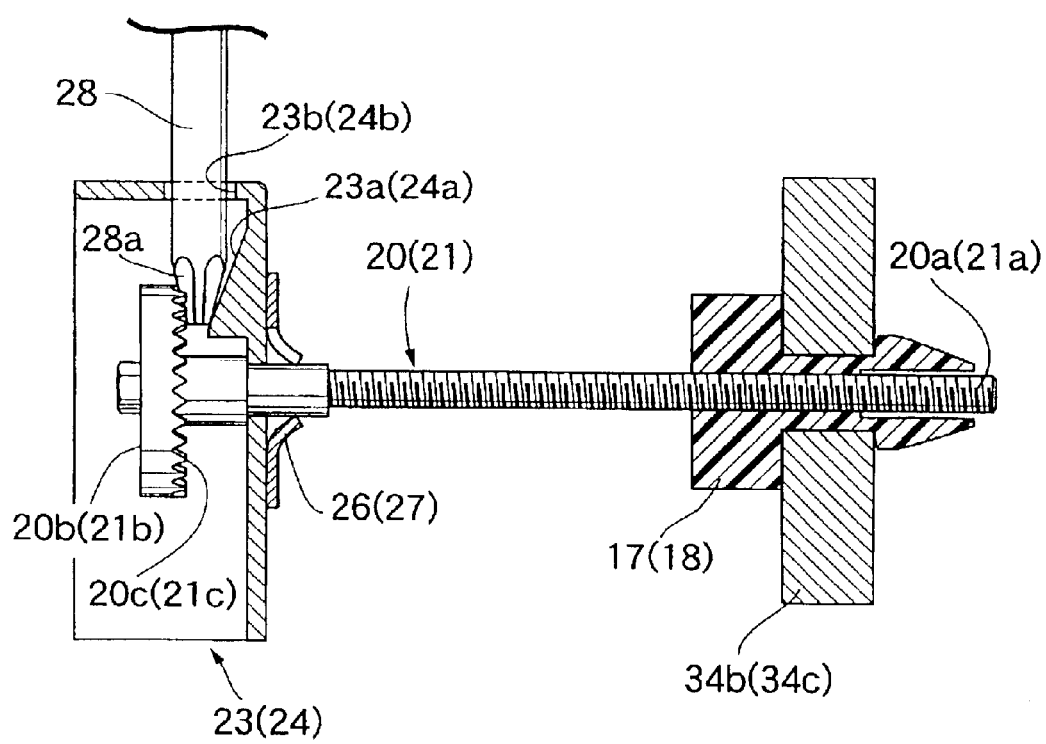
FIG. 8 is an enlarged cross-sectional view of part 8 in FIG. 5.
Figure 9:
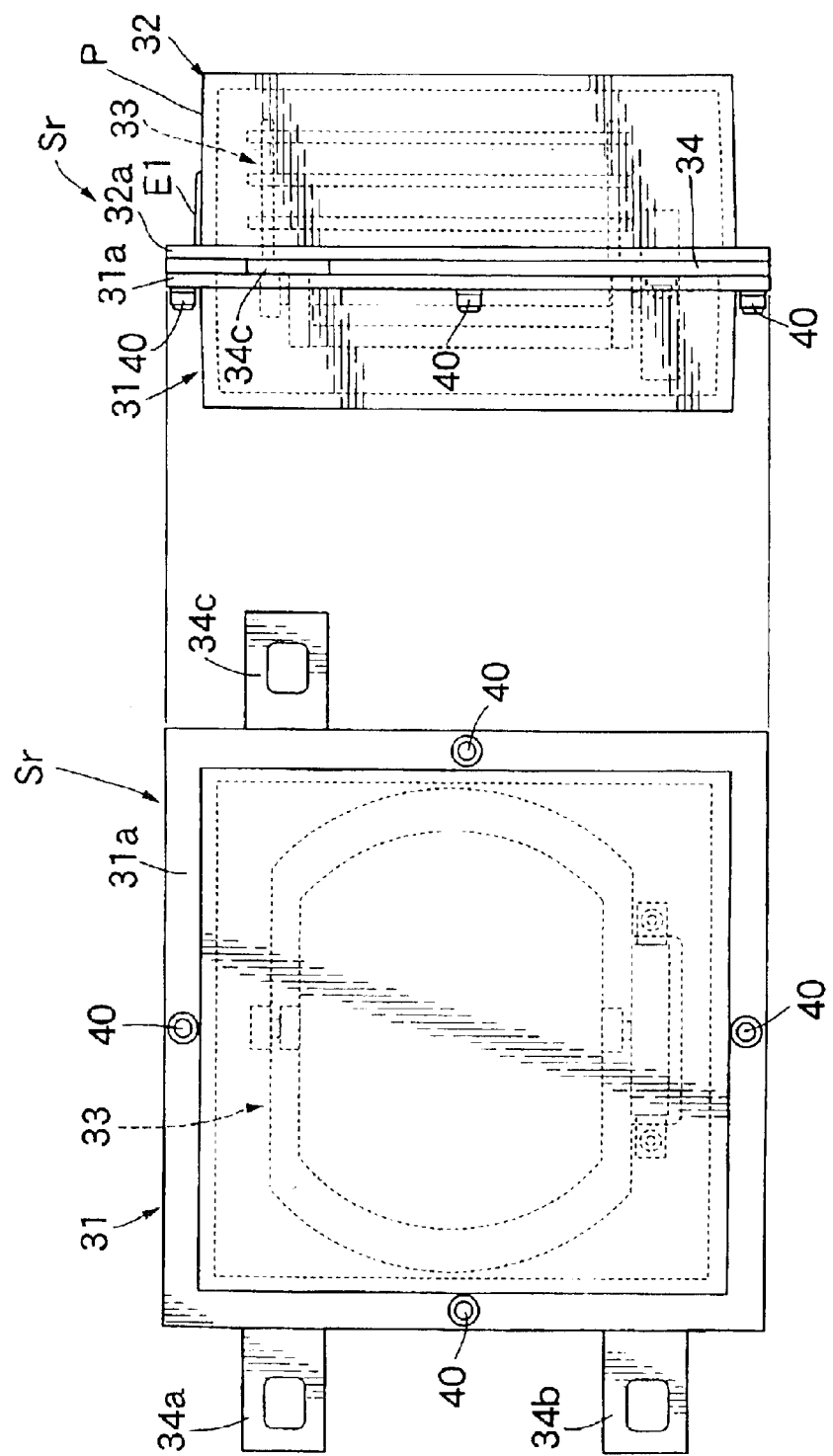
FIG. 9 shows front and side views of the radar system.

As shown in FIG. 8, base ends of bolt members 20 and 21 passing through the bolt support members 23 and 24 positioned to the rear of the lower right and upper left stays 34b and 34c are axially fixed by push nuts 26 and 27. Male thread parts 20a and 21a are screwed into the nut members 17 and 18. Gear teeth 20c and 21c are formed on the front face of heads 20b and 21b of the bolt members 20 and 21. Guide projections 23a and 24a facing the gear teeth 20c and 21c project from the rear face of the bolt support members 23 and 24. Openings 23b and 24b are formed on upper faces of the support members 23 and 24 and receive a adjusting bit 28 (described below).

Figure 4:
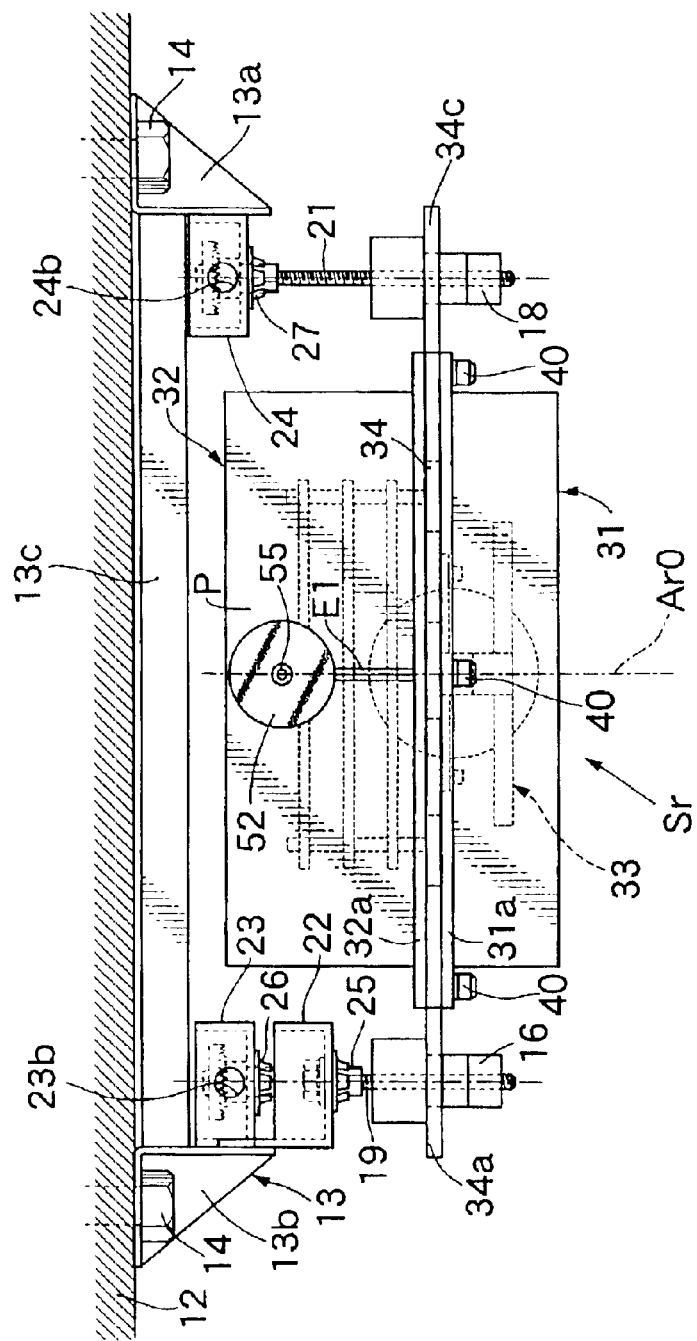
FIG. 4 is a view taken in the direction of arrow 4 in FIG. 3.
Figure 5:
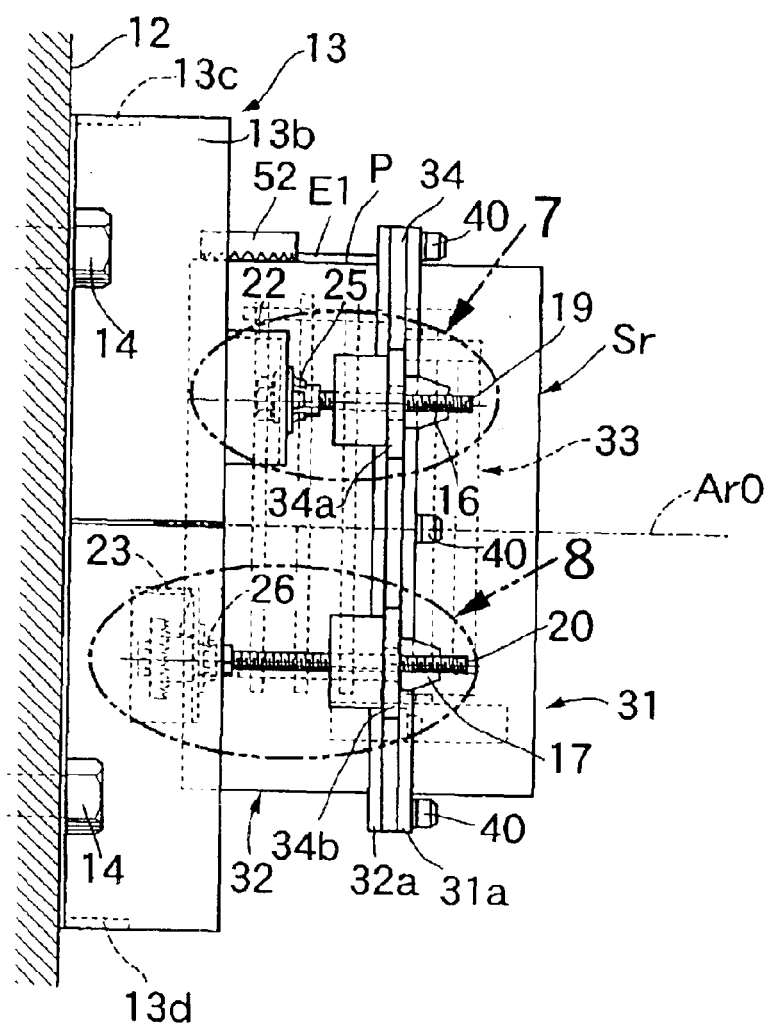
FIG. 5 is a view taken in the direction of arrow 5 in FIG. 3.
Figure 6:
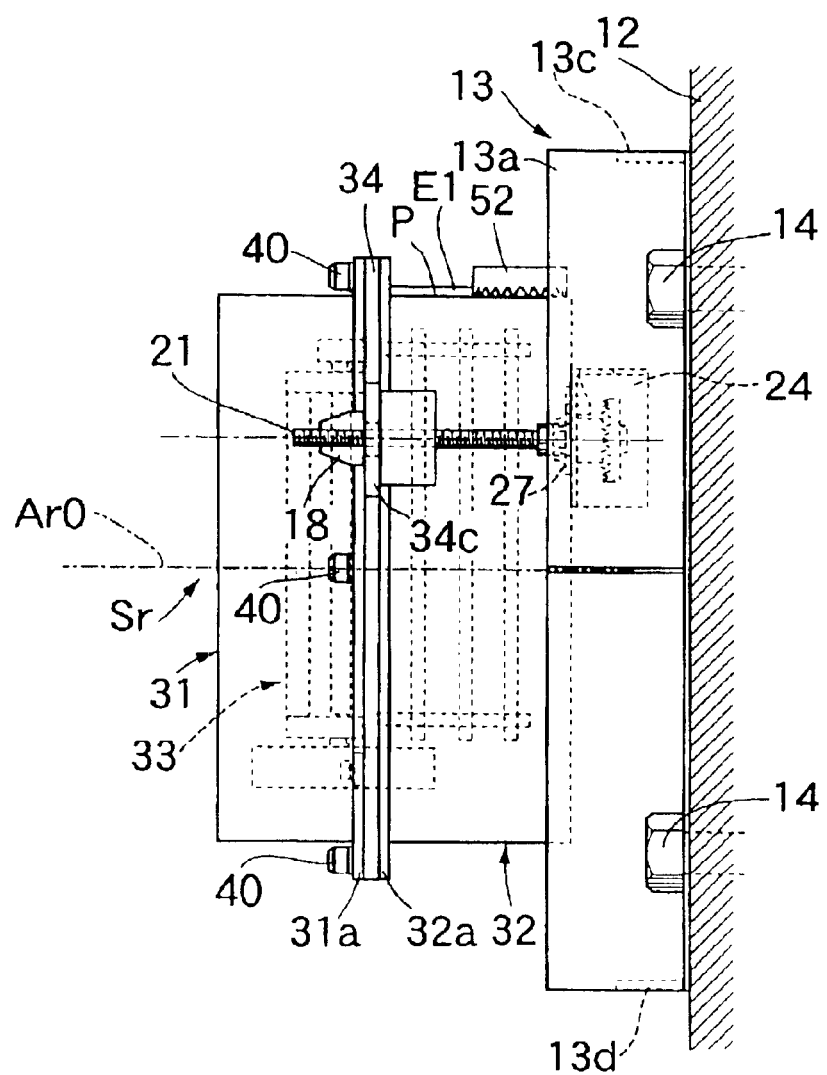
FIG. 6 is a view taken in the direction of arrow 6 in FIG. 3.

As shown in FIG. 4, the upper right bolt support member 22 is displaced to the front with respect to the lower right bolt support member 23. When viewed from above, the opening 23b on the upper face of the lower right bolt support member 23 is exposed without being blocked by the upper right bolt support member 22.

As shown in FIGS. 9 to 12, the radar system Sr includes the radome 31, which has a box shape open at the rear, the casing 32, which has a box shape open at the front, and a radar mechanism part 33, which is housed within interior spaces of the radome 31 and the casing 32.

Figure 12:
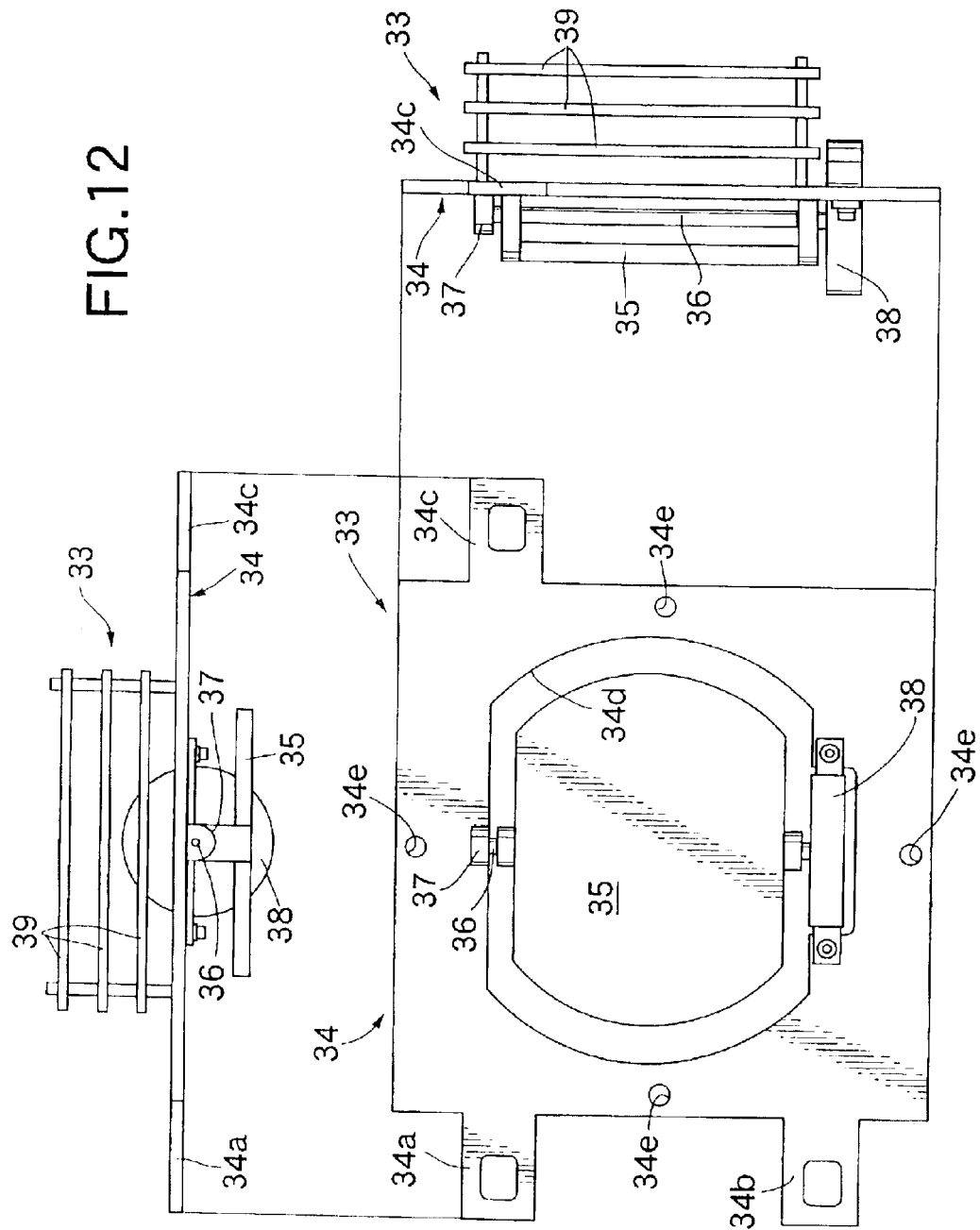
FIG. 12 shows front, top, and side views of a radar mechanism part.

As shown in FIG. 12, the radar mechanism part 33 includes a plate-shaped frame 34 and stays 34a, 34b, and 34c, which project from an outer periphery of the frame 34. A flat antenna 35 is fitted in an opening 34d formed in a central part of the frame 34. The upper end of a support shaft 36 fixed to a rear part of the flat antenna 35 is supported on the frame 34 via a bearing 37. The lower end of the support shaft 36 is connected to a motor 38 fixed to the frame 34.

Rotating the motor 38 to-and-fro pivots the flat antenna 35 to-and-fro around the support shaft 36. Three circuit boards 39 are supported on the rear face of the frame 34 in a stacked state. Four bolt holes 34e are formed in the frame 34 at intervals of 90 degrees.

Figure 10:
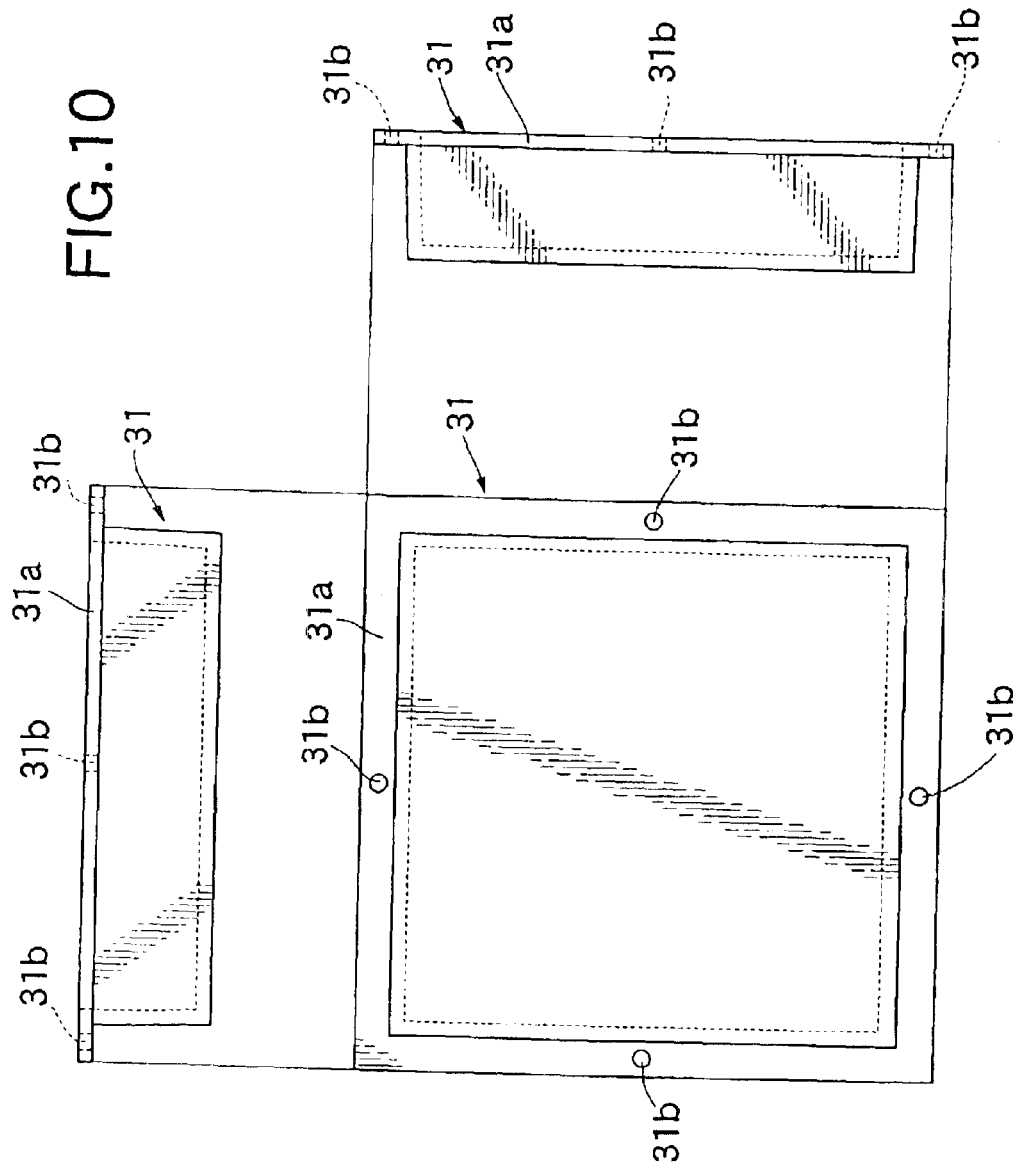
FIG. 10 shows front, top, and side views of a radome.
Figure 11:
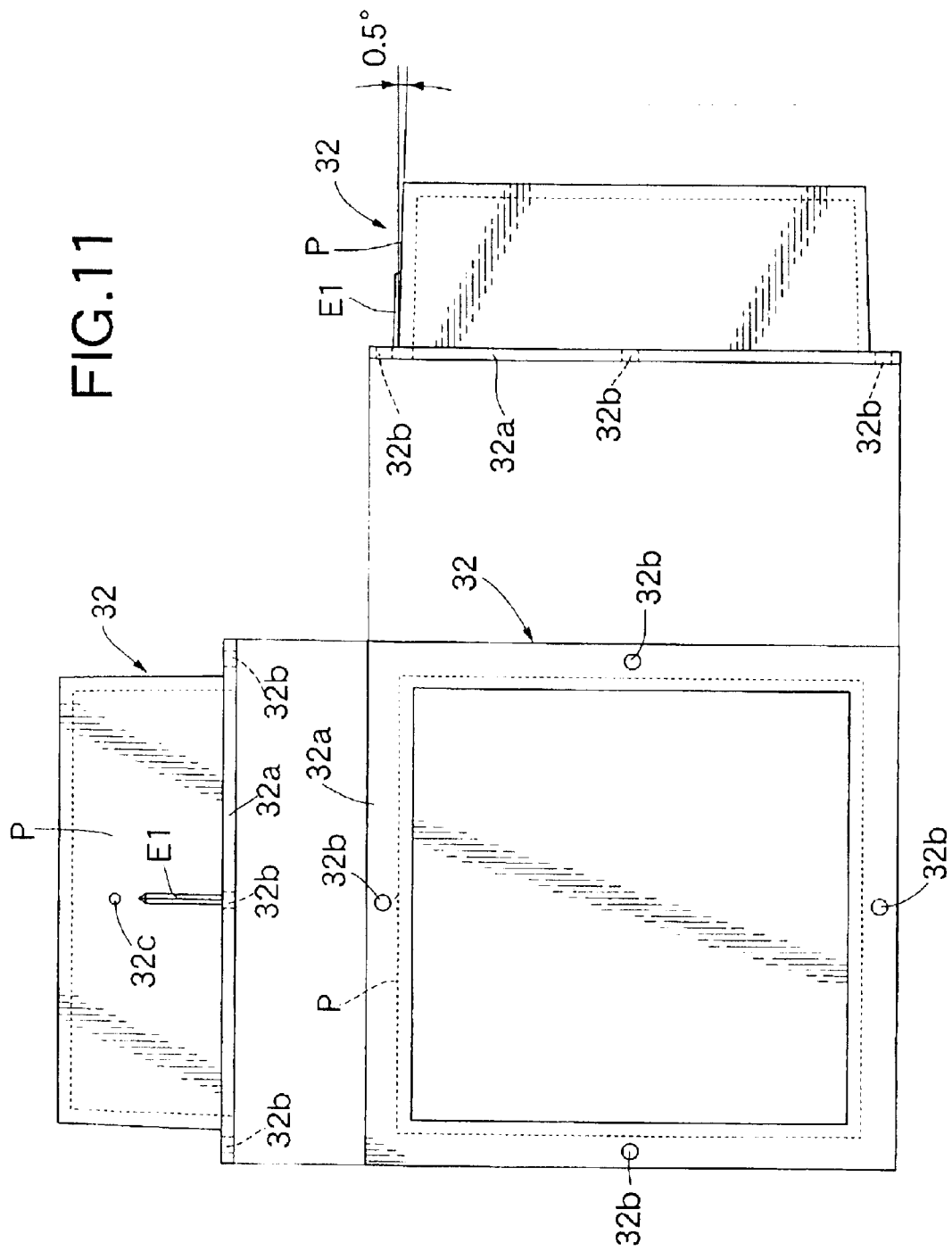
FIG. 11 shows front, top, and side views of a casing.

As shown in FIG. 10, the radome 31 covering the front face of the radar mechanism part 33 is a box-shaped member having an open rear face with four bolt holes 31b formed in a flange 31a projecting radially outward from the rear face of the radome 31. As shown in FIG. 11, the casing 32 covering the rear face of the radar mechanism part 33 is a box-shaped member having an open front face with four bolt holes 32b formed in a flange 32a projecting radially outward from the front face of the casing 32. The radome 31, the casing 32, and the radar mechanism part 33 are tightened together into a unit by four bolts 40, wherein the frame 34 of the radar mechanism part 33 is sandwiched between the flange 31a of the radome 31 and the flange 32a of the casing 32.

Figure 13:
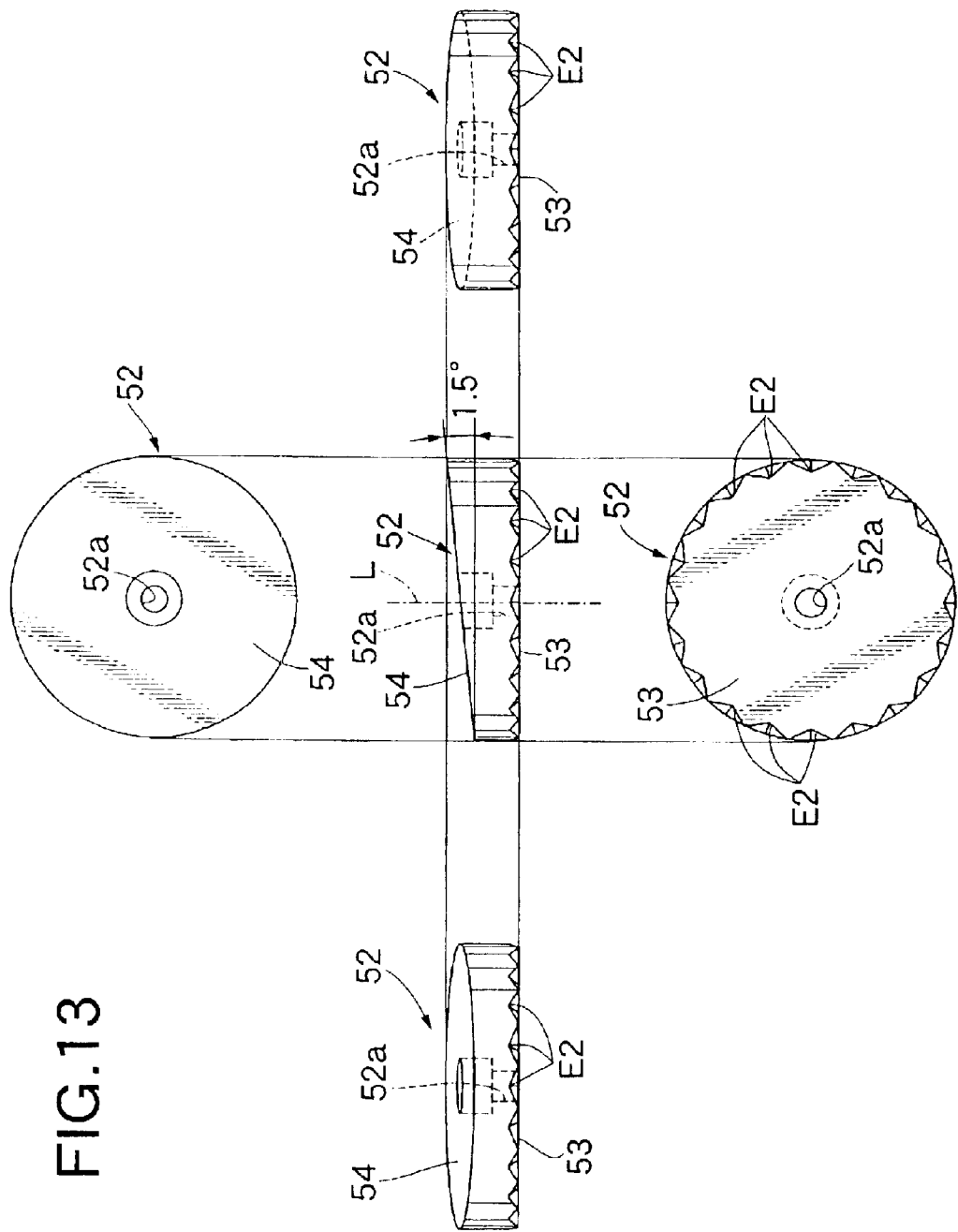
FIG. 13 is a multi-view of a adjusting member.
Figure 14:
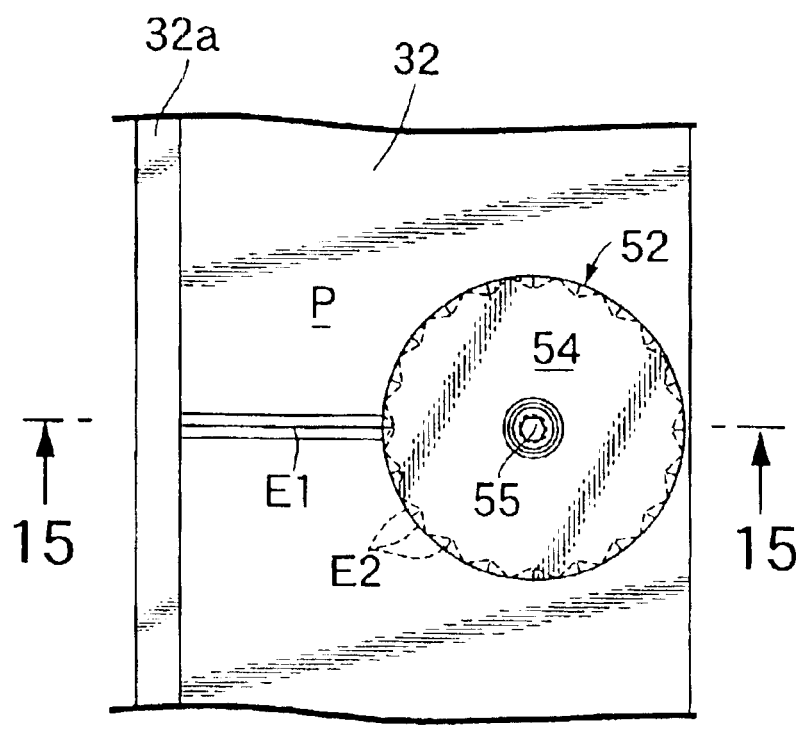
FIG. 14 is an enlarged view of an essential part in FIG. 4.
Figure 15:
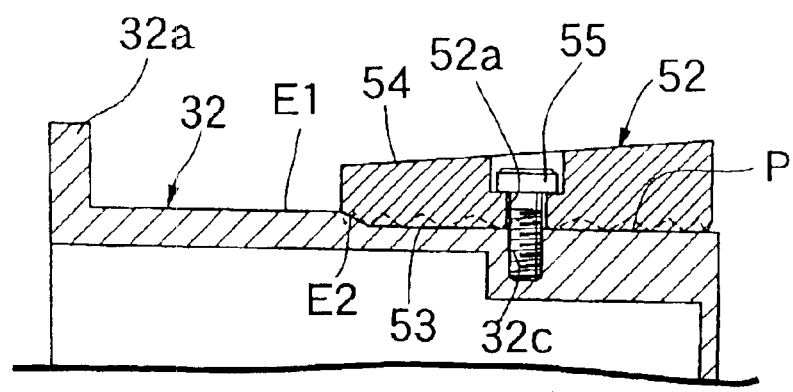
FIG. 15 is a cross section taken along line 15—15 in FIG. 14.

As shown in FIGS. 13 to 15, an outer (upper) face of the box-shaped casing 32 forms a flat reference plane P, and a adjusting member 52 is fixed thereto. The adjusting member 52 is a disk-shaped member having an axis L; a first base surface 53 that is perpendicular to the axis L, and a second base surface 54 that forms a predetermined angle (1.5° in the illustrated exemplary embodiment) with respect to the first base surface 53. That is, the first base surface 53 and the second base surface 54 of the adjusting member 52 form a wedge shape therebetween. The first base surface 53 of the adjusting member 52 has a circular shape and is in intimate contact with the outer (upper) face, which forms the reference plane P, of the casing 32. A stepped bolt hole 52a formed on the axis L of the adjusting member 52 opens on the second base surface 54. A plurality, e.g., 20, parts to be latched E2, which are triangular notches, are formed on an outer peripheral part of the first base surface 53 at equal intervals of 18°. Formed on the upper face of the casing 32 are a bolt hole 32c and a latching part E1, which is formed from one ridge and corresponds to the parts to be latched E2 of the adjusting member 52. The bolt hole 32c corresponds to the bolt hole 52a of the adjusting member 52.

Inserting a bolt 55 into the bolt hole 52a of the adjusting member 52 and screwing the bolt 55 into the bolt hole 32c of the casing 32 fixes the adjusting member 52 to the casing 32. At this point, one of the 20 parts to be latched E2 of the adjusting member 52 engages the latching part E1 of the casing 32, thus positioning the adjusting member 52 in the rotational direction. A head part of the bolt 55 is positioned below the second base surface 54 of the adjusting member 52 and avoids any interference with the placement of a level 29 on the second base surface 54.

The 20 parts to be latched E2 of the adjusting member 52 are designated as No. 1 to No. 20. The part to be latched E2 corresponding to the thinnest portion of the adjusting member 52 is designated as No. 1, and the part to be latched E2 corresponding to the thickest portion of the adjusting member 52 is designated as No. 11. The reference plane P of the synthetic resin casing 32 is given a predetermined slope (0.5° up to the front in the illustrated exemplary embodiment) so as to enable release from a mold when molding. Because the second base surface 54 is angled 1.5° relative to the first base surface 53 of the adjusting member 52 (see FIG. 13), when the No. 1 part to be latched E2 is engaged with the latching part E1, the second base surface 54 slopes down to the front by 1.0°. When the No. 11 part to be latched E2 is engaged with the latching part E1, the second base surface 54 slopes up to the front by 2.0°.

Figure 17:
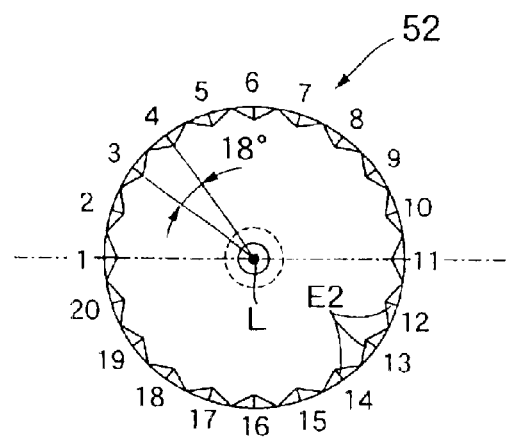
FIG. 17 is a view showing a first base surface of the adjusting member.

Rotating the adjusting member 52 around the axis L to change the part to be latched E2 that is engaged with the latching part E1 enables the angle of the second base surface 54 of the adjusting member 52 to be adjusted at 11 different angles at intervals of 0.3°, from a state of sloping downward by 1.0° to a state of sloping upward by 2.0°, as shown in FIG. 17 and Table 1.

TABLE 1

| Part to be latched No. | Angle of second base surface | | Part to be latched No. | Angle of second base surface | |
| --- | --- | --- | --- | --- | --- |
| 1  | 1.0° | Down | 11 | 2.0° | Up |
| 2  | 0.7° | Down | 12 | 1.7° | Up |
| 3  | 0.4° | Down | 13 | 1.4° | Up |
| 4  | 0.1° | Down | 14 | 1.1° | Up |
| 5  | 0.2° | Up   | 15 | 0.8° | Up |
| 6  | 0.5° | Up   | 16 | 0.5° | Up |
| 7  | 0.8° | Up   | 17 | 0.2° | Up |
| 8  | 1.1° | Up   | 18 | 0.1° | Down |
| 9  | 1.4° | Up   | 19 | 0.4° | Down |
| 10 | 1.7° | Up   | 20 | 0.7° | Down |

Figure 18:
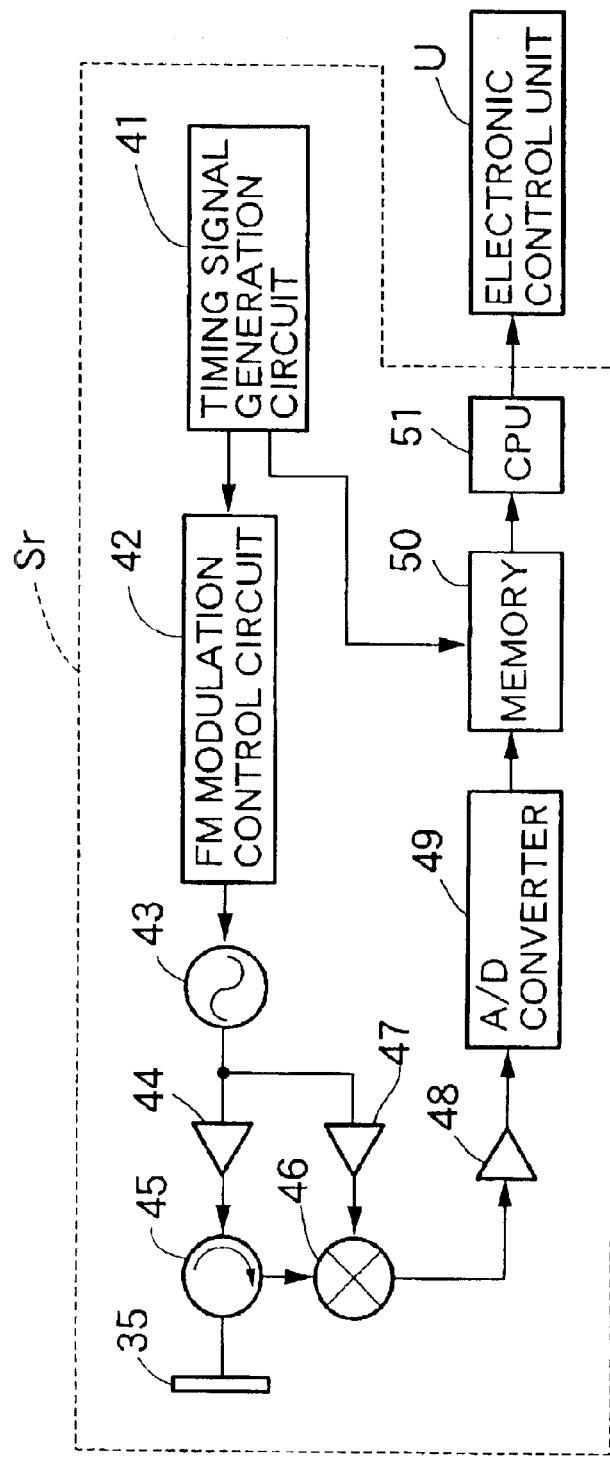
FIG. 18 is a block diagram showing the arrangement of the radar system.

As shown in FIG. 18, in the radar system Sr, which is an FM-CW millimeter wave radar system, transmission from a transmitter 43 is modulated by an FM modulation control circuit 42 based on a timing signal input from a timing signal generation circuit 41. A transmitted wave having a frequency modulated into a triangular waveform, as shown by the solid line in FIG. 19 (A), is transmitted from the flat antenna 35, via an amplifier 44 and a circulator 45, toward various horizontal directions, for example, separated into 9 channels, in a predetermined detection range in front of the subject vehicle. When the flat antenna 35 receives a FM-CW wave reflected from an object, such as a preceding vehicle, for example, if the object is approaching the subject vehicle, as shown by the broken line in FIG. 19(A), the received wave appears behind the transmitted wave with a frequency lower than that of the transmitted wave on the increase side where the frequency of the transmitted wave linearly increases. Also, the received wave appears behind the transmitted wave with a frequency higher than that of the transmitted wave on the decrease side where the frequency of the transmitted wave linearly decreases.

Figures 19A, 19B:
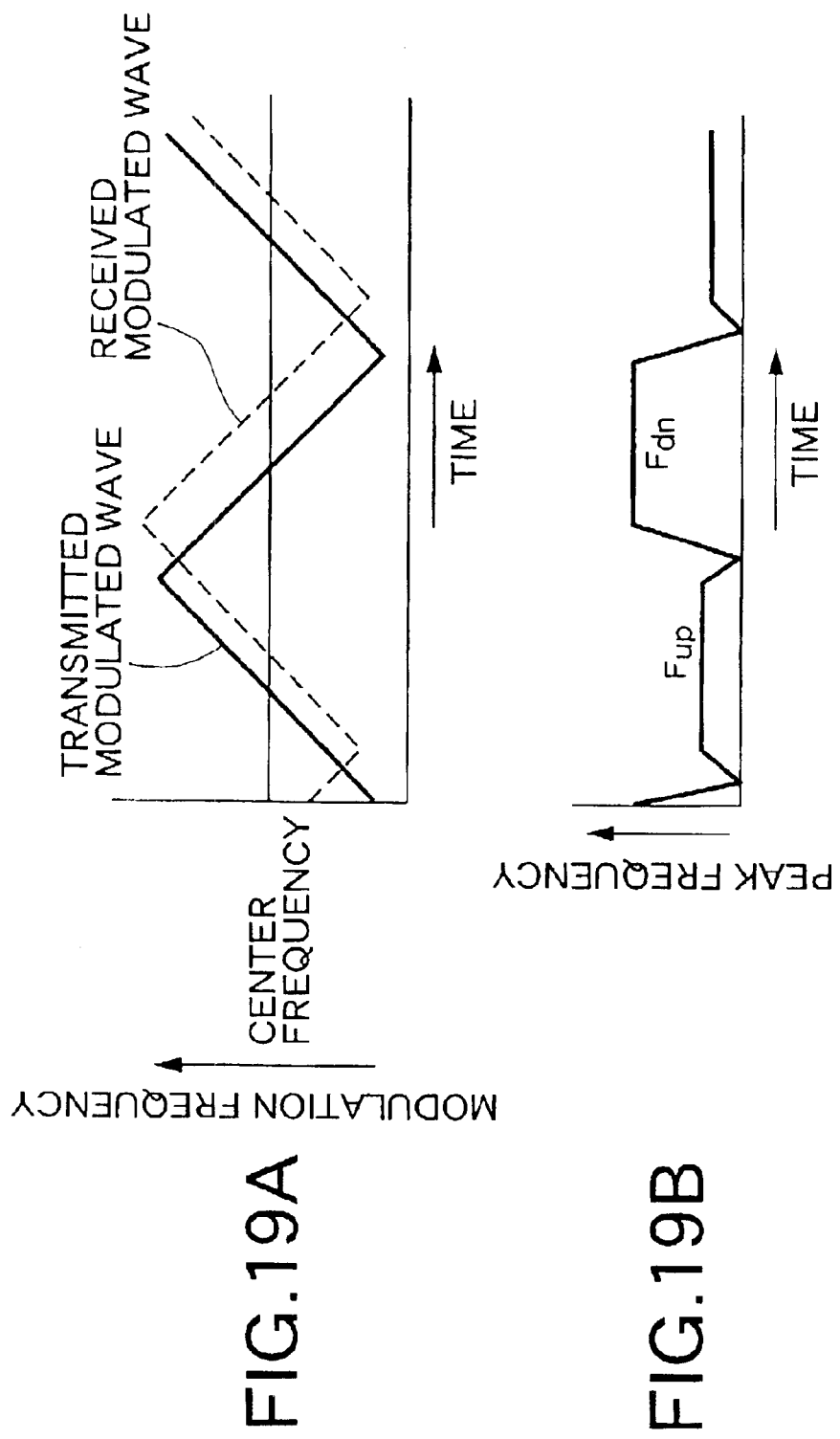
FIG. 19 is a graph showing the waveform and peak frequency of transmitted and received waves when an object is approaching the radar system.

The received wave received by the flat antenna 35 is input into a mixer 46 via the circulator 45. A transmitted wave that is separated from the transmitted wave output from the transmitter 43 is also input into the mixer 46 via the amplifier 47 in addition to the received wave from the circulator 45. Mixing the transmitted wave and the received wave in the mixer 46 generates, as shown in FIG. 19(B), a beat signal having a peak frequency Fup on the increase side, where the frequency of the transmitted wave linearly increases, and a peak frequency Fdn on the decrease side, where the frequency of the transmitted wave linearly decreases.

The beat signal obtained by the mixer 46 is amplified by an amplifier 48 to a required amplitude, converted by an A/D converter 49 at each sampling time, and stored chronologically as digitized amplified data in a memory 50. A timing signal from the timing signal generation circuit 41 is also input into the memory 50, and the memory 50 separately stores, based on the timing signal, data for the increase side, where the frequency of the transmitted wave increases, and data for the decrease side, where the frequency thereof decreases.

A central processing unit (CPU) 51 calculates, based on the data stored in the memory 50, the distance and the relative speed with respect to the object by a known method employing the peak frequencies Fup and Fdn, and communicates with an electronic control unit U for controlling the vehicle.

Figure 20:
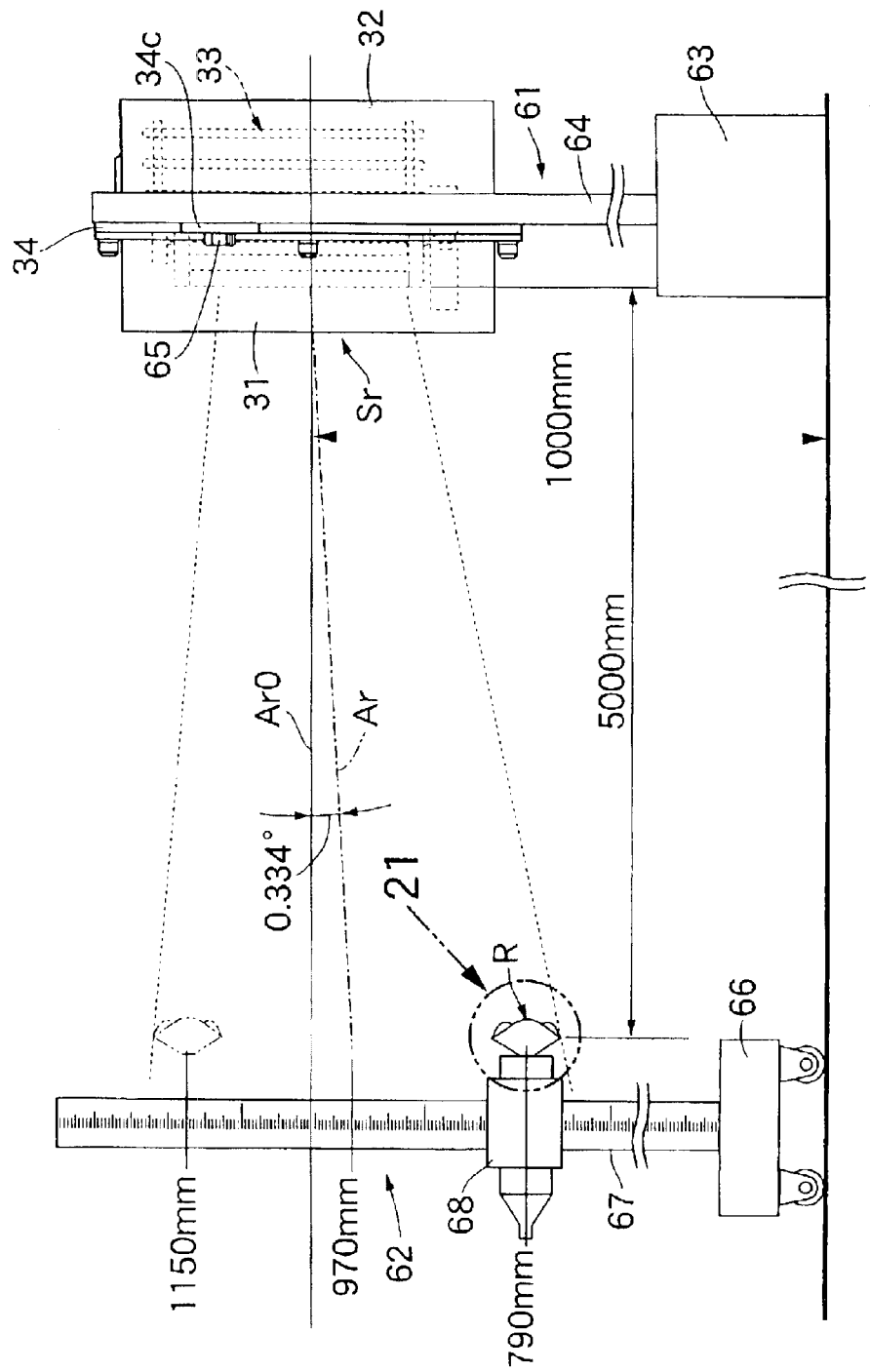
FIG. 20 is a diagram showing a radar mechanism part support jig and a target jig.
Figure 21:
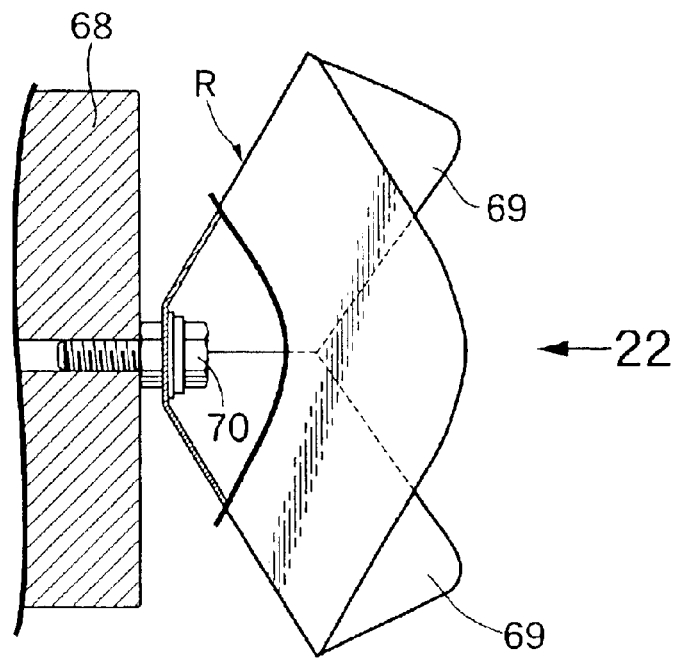
FIG. 21 is an enlarged view of a portion indicated by reference numeral 21 in FIG. 20.
Figure 22:
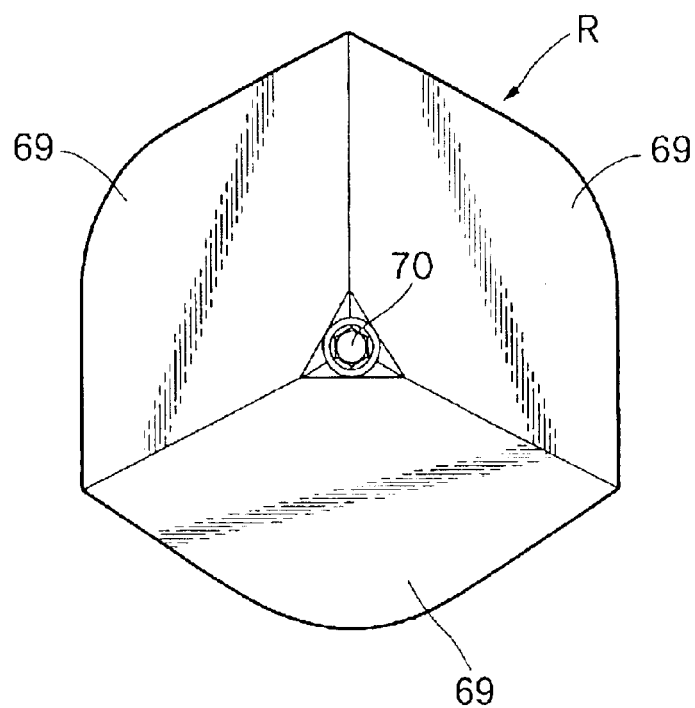
FIG. 22 is a view taken in the direction of arrow 22 in FIG. 21.

The radar mechanism part 33 of the radar system Sr is configured wherein an object detection axis Ar is perpendicular to the frame 34. However, because of errors during production, the angle of the object detection axis Ar can be displaced vertically relative to the frame 34. FIGS. 20 to 22 show a radar system support jig 61 and a target jig 62 that detect the vertical displacement of the object detection axis Ar relative to the radar mechanism part 33.

The radar system support jig 61, which supports the radar system Sr, includes two posts 64 standing vertically on a pedestal 63. The stays 34a to 34c of the frame 34 are fixed to the posts 64 via bolts 65. The frame 34 of the radar mechanism part 33, which is fixed to the radar system support jig 61, is also vertical to the floor. The target jig 62 includes a post 67 standing vertically on a pedestal 66. A reference reflector R is fixed to a slider 68 supported on the post 67 such that the vertical position of the slider 68 is freely adjusted. The reference reflector R has three mutually perpendicular flat reflecting surfaces 69 and is fixed to the slider 68 via a bolt 70 provided at the vertex of the three surfaces 69. The reflecting surfaces 69 of the reference reflector R are required to reflect millimeter waves and may be formed from a metal or by attaching, e.g., by glue, aluminum foil onto cardboard.

The operation of the first embodiment of the present invention having the above-described structure is now explained.

The vertical displacement of the object detection axis Ar relative to the frame 34 of the radar mechanism part 33, that is, the actual displacement of the object detection axis Ar from the target object detection axis Ar0 (the horizontal direction in the embodiment) is detected. As shown in FIG. 20, the frame 34 is fixed to the radar system support jig 61 by the bolts 65 wherein the center of the flat antenna 35 is 1000 mm above the floor. The reference reflector R fixed to the slider 68 of the target jig 62 is positioned 5000 mm forward from the front face of the radar system Sr. The reference reflector R is detected by applying millimeter wave radiation from the radar mechanism part 33 while changing the vertical position of the reference reflector R. An upper limit position and a lower limit position of the reference reflector R, where the reception level of the reflected wave exceeds a threshold value, are thus detected.

In the exemplary situation shown in FIG. 20, since the upper limit height of the reference reflector R is 1150 mm, and the lower limit height thereof is 790 mm, the height of the mean position is 970 mm. If the angle of the object detection axis Ar relative to the frame 34 of the radar mechanism part 33 is not vertically displaced, then the height of the mean position should be the same as that of the center of the flat antenna 35, which is 1000 mm. However, since the actual value is 970 mm, the angle of the object detection axis Ar is displaced downward by 0.344°.

Whereas the angle of the object detection axis Ar of the radar mechanism part 33 slopes downward to the front by 0.344°, the reference plane P of the casing 32 slopes upward to the front by 0.5°. Accordingly, fixing the adjusting member 52 to the reference plane P of the casing 32 in a predetermined rotational position results in the direction of the second base surface 54 of the adjusting member 52 coinciding with the direction of the object detection axis Ar, which slopes downward to the front by 0.344°. That is, as is clear from FIG. 17 and Table 1, rotating the adjusting member 52 so that No. 3 or No. 19 part to be latched E2, among the 20 parts to be latched E2 of the first base surface 53, engages the latching part E1 formed on the reference plane P, and then fixing the adjusting member 52 to the casing 32 by the bolt 55, results in the direction of the second base surface 54 of the adjusting member 52 coinciding with the direction of the object detection axis Ar with a slight error (0.4°−0.344°=0.056°).

Figure 16:
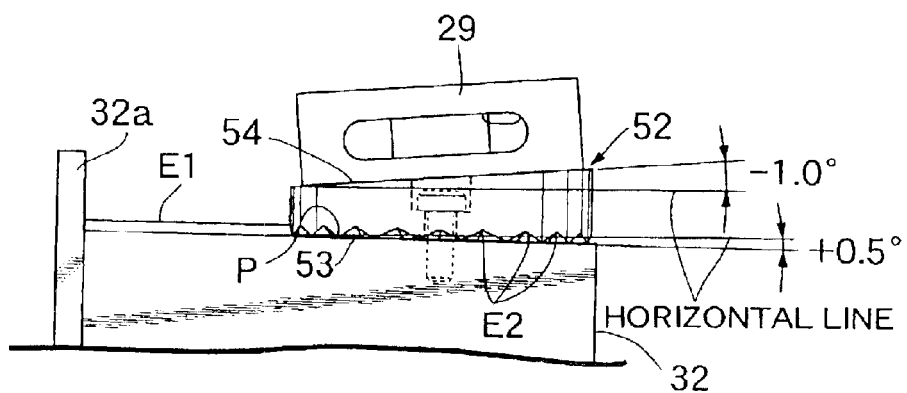
FIG. 16 is an explanatory view of an operation corresponding to FIG. 15.

The radar system Sr is then detached from the radar system support jig 61 and mounted on the support plate 12 of the vehicle body via the bracket 13 and, as shown in FIG. 16, in a state in which the level 29 is placed on the second base surface 54 of the adjusting member 52, the vertical angle of the casing 32 of the radar system Sr is adjusted wherein the second base surface 54 is horizontal. As described above, the second base surface 54 and the object detection axis Ar are parallel to each other, adjusting the second base surface 54 to be horizontal results in the object detection axis Ar being horizontal, thus completing the aiming of the radar system Sr.

Since detection of lateral displacement of the object detection axis Ar of the radar system Sr is not directly related to the subject matter of the present invention, explanation of such is omitted herein, and any known method can be used.

The object detection axis Ar of the radar system Sr is adjusted as described below. When the actual object detection axis Ar of the radar system Sr is vertically displaced relative to the target object detection axis Ar0, a concavo-convex part 28a at the tip end of the adjusting bit 28 engages the gear teeth 20c of the head 20b of the lower right bolt member 20 and rotated. To prevent the concavo-convex part 28a of the adjusting bit 28 from disengaging from the gear teeth 20c of the bolt member 20, the back face of the concavo-convex part 28a is supported by the guide projection 23a of the bolt support member 23 (see FIG. 8).

Rotating the lower right bolt member 20 to push the stay 34b of the frame 34 forward results in the radar system Sr pivoting upward around the two upper bolt members 19 and 21, thereby adjusting the object detection axis Ar upward. Conversely, pulling the stay 34b of the frame 34 to the rear results in the radar system Sr pivoting downward around the two upper bolt members 19 and 21, thereby adjusting the object detection axis Ar downward.

In the same manner, rotating the upper left bolt member 21 while using the adjusting bit 28 to push the stay 34c of the frame 34 forward results in the radar system Sr pivoting rightward around the two right bolt members 19 and 20, thereby adjusting the object detection axis Ar rightward. Conversely, pulling the stay 34c of the frame 34 to the rear results in the radar system Sr pivoting leftward around the two right bolt members 19 and 20, thereby adjusting the object detection axis Ar leftward.

As described above, even when the direction of the object detection axis Ar is displaced relative to the radar mechanism part 33 from an error during assembly of the radar system Sr, because the second base surface 54 of the adjusting member 52 fixed to the reference plane P of the casing 32 is parallel to the object detection axis Ar, the object detection axis Ar is easily and precisely made to coincide with the target horizontal direction merely by adjusting the second base surface 54 such that the object detection axis Ar is horizontal using the level 29. In this stage, since the level 29 is mounted for horizontal adjustment on the second base surface 54, which forms an upper face of the casing 32, a general level for detecting horizontal direction can be used, and the position in which the level 29 is to be placed is not mistaken.

Figure 23:
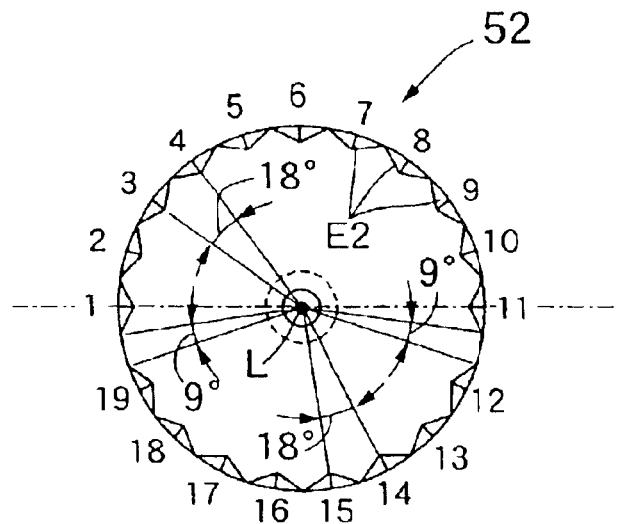
FIG. 23 is a bottom view showing a first base surface of a adjusting member according to a second embodiment.

A second embodiment of the present invention will be explained below with reference to FIG. 23.

In the first embodiment described above, since the No. 2 to No. 10 parts to be latched E2 on one side and the No. 19 to No. 12 parts to be latched E2 on the other side of the adjusting member 52 are positioned symmetrically with respect to a line between the No. 1 part to be latched E2 and the No. 11 part to be latched E2, the angle of the second base surface 54 of the adjusting member 52 is identical when, for example, the No. 2 part to be latched E2 is used and when the No. 20 part to be latched E2 is used. Accordingly, there are only 11 different adjustment angles with a 0.3° pitch.

In the second embodiment, to increase the number of different adjustable angles for the second base surface 54 of the adjusting member 52, parts to be latched E2 on the first base surface 53 of the adjusting member 52 are formed at unequal intervals in the circumferential direction. That is, No. 1 to No. 11 (total 11) parts to be latched E2 are the same as those of the first embodiment, but spaces corresponding to a half pitch (i.e., 9°) are placed next to the No. 1 and the No. 11 parts to be latched E2, and between the two spaces No. 12 to No. 19 (total 8) parts to be latched E2 are placed at intervals of 18°. The angular difference of the second base surface 54 between the No. 1 and the No. 19 parts to be latched E2 and the angular difference of the second base surface 54 between the No. 11 and the No. 12 parts to be latched E2 is 0.45°, which differs from the 0.3° of the other angular differences. As a result, as shown in FIG. 23 and Table 2, the angles of the second base surface 54 of the adjusting member 52 corresponding to the No. 1 to the No. 19 parts to be latched E2 do not duplicate each other and are all different from each other, thus giving 19 different adjustable angles for the second base surface 54 of the adjusting member 52 and thereby improving the precision of adjusting the object detection axis Ar.

TABLE 2

| Part to be latched No. | Angle of second base surface | | Part to be latched No. | Angle of second base surface | |
|---|---|---|---|---|---|
| 1 | 1.00° | Down | 11 | 2.00° | Up |
| 2 | 0.70° | Down | 12 | 1.55° | Up |
| 3 | 0.40° | Down | 13 | 1.25° | Up |
| 4 | 0.10° | Down | 14 | 0.95° | Up |
| 5 | 0.20° | Up | 15 | 0.65° | Up |
| 6 | 0.50° | Up | 16 | 0.35° | Up |
| 7 | 0.80° | Up | 17 | 0.05° | Up |
| 8 | 1.10° | Up | 18 | 0.25° | Down |
| 9 | 1.40° | Up | 19 | 0.55° | Down |
| 10 | 1.70° | Up | | | |

Figure 24:
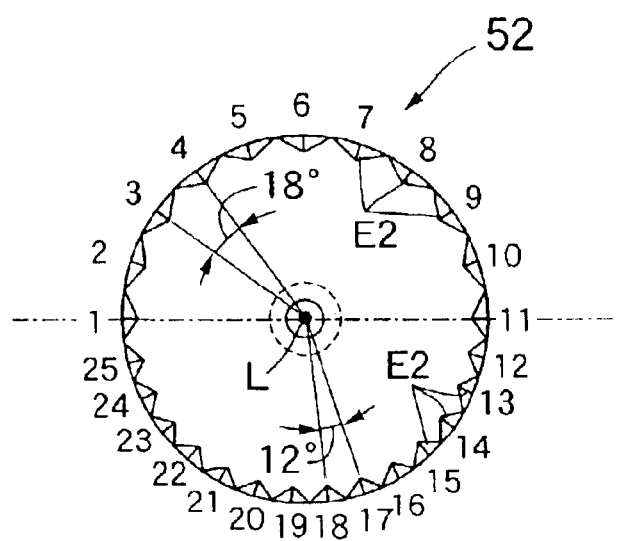
FIG. 24 is a bottom view showing a first base surface of a adjusting member according to a third embodiment.

A third embodiment of the present invention will now be explained below with reference to FIG. 24.

Also in the third embodiment, in order to increase the number of different adjustable angles for the second base surface 54 of the adjusting member 52, parts to be latched E2 on the first base surface 53 of the adjusting member 52 are formed at unequal intervals in the circumferential direction. That is, No. 1 to No. 11 (for a total of 11) parts to be latched E2 are placed at the same intervals of 18° as in the first embodiment. Remaining No. 12 to No. 25 (for a total of 14) parts to be latched E2 are formed at intervals of 12°. As a result, as shown in FIG. 24 and Table 3, among a total of 25 parts to be latched E2, the angle of the second base surface 54 is identical only between parts to be latched E2 No. 3 and No. 23, parts to be latched E2 No. 5 and No. 20, parts to be latched E2 No. 7 and No. 17, and parts to be latched E2 No. 9 and No. 14. Also, there are 21 different adjustable angles of the second base surface 54 of the adjusting member 52, which improve the adjustment precision of the object detection axis Ar.

TABLE 3

| Part to be latched No. | Angle of second base surface | | Part to be latched No. | Angle of second base surface | |
|---|---|---|---|---|---|
| 1 | 1.0° | Down | 11 | 2.0° | Up |
| 2 | 0.7° | Down | 12 | 1.8° | Up |
| 3 | 0.4° | Down | 13 | 1.6° | Up |
| 4 | 0.1° | Down | 14 | 1.4° | Up |
| 5 | 0.2° | Up | 15 | 1.2° | Up |
| 6 | 0.5° | Up | 16 | 1.0° | Up |
| 7 | 0.8° | Up | 17 | 0.8° | Up |
| 8 | 1.1° | Up | 18 | 0.6° | Up |
| 9 | 1.4° | Up | 19 | 0.4° | Up |
| 10 | 1.7° | Up | 20 | 0.2° | Up |
| | | | 21 | 0.0° | Up |
| | | | 22 | 0.2° | Down |
| | | | 23 | 0.4° | Down |
| | | | 24 | 0.6° | Down |
| | | | 25 | 0.8° | Down |

Figure 25:
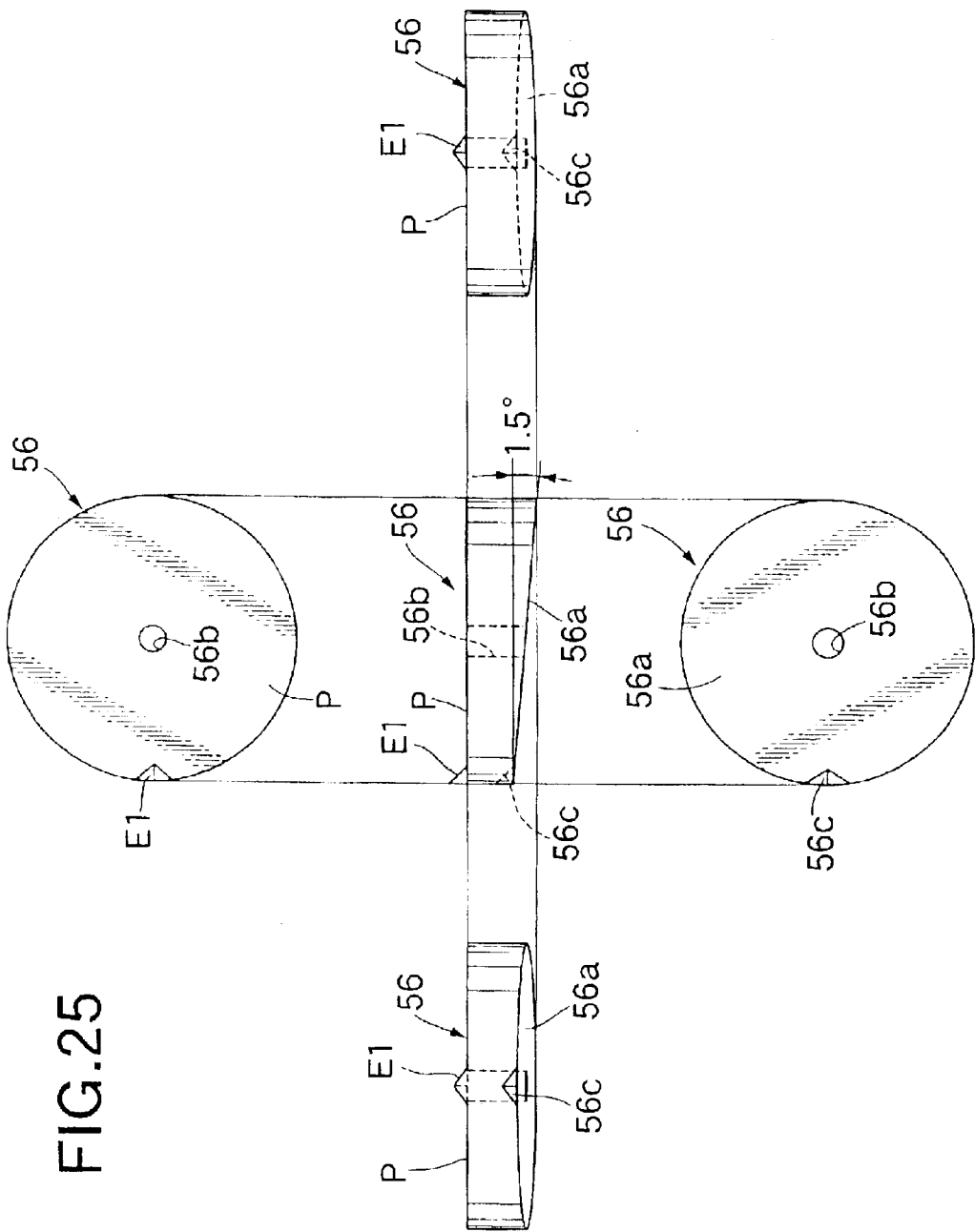
FIG. 25 is a multi-view of a spacer according to a fourth embodiment.
Figure 26:
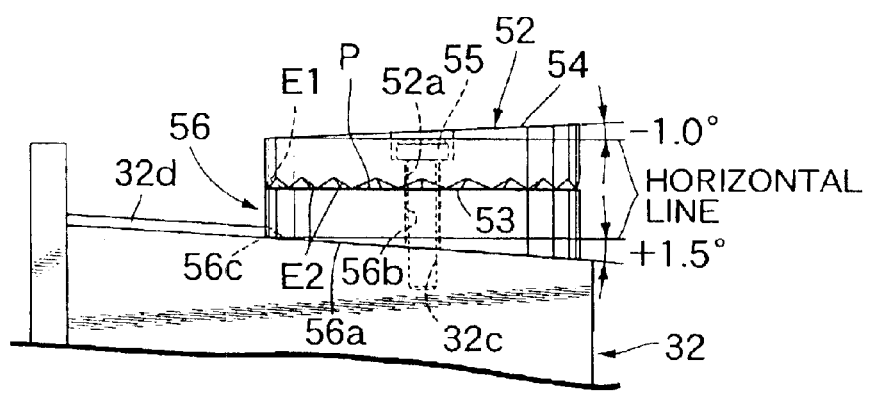
FIG. 26 is a side view showing a state in which the spacer and a adjusting member are mounted on a casing.

A fourth embodiment of the present invention will now be explained below with reference to FIGS. 25 and 26.

In the first embodiment, the outer face of the casing 32 has an inclination angle of 0.5° for release from the mold, and if this inclination angle is relatively too big (example, sloping up to the front at 1.5°), several problems may arise. In this case, in order to adjust the second base surface 54 of the adjusting member 52 to slope downward to the front by 1°, the wedge angle formed by the first base surface 53 and the second base surface 54 of the adjusting member 52 is required to be set at 2.5°. However, when the wedge angle of the adjusting member 52 is set at 2.5°, if the adjusting member 52 is mounted by rotating it through 180°, the angle of the second surface 54 slopes upward to the front by 1.5°+2.5°=4.0°. As a result, the adjusting pitch of the second base surface 54 by No. 1 to No. 20 (total 20) parts to be latched E2 disposed at equal intervals is coarse (1°+4°)/10= 0.5°, thereby degrading the adjustment precision of the object detection axis Ar.

In the fourth embodiment, a spacer 56 having a mounting face 56a and reference plane P that form a wedge shape with an inclination of 1.5° is therefore fixed to an outer face of the casing 32. A first base surface 53 of the adjusting member 52 is supported by the reference plane P of the spacer 56 instead of the reference plane P formed on the outer face of the casing 32 as in the first to third embodiments. In this case, counterbalancing an inclination sloping upward to the front by 1.5° of the outer face of the casing 32 by the inclination sloping downward to the front by 1.5° of the reference plane P with respect to the mounting face 56a of the spacer 56 enables the reference plane P of the spacer 56 to be horizontal.

The spacer 56 has a disk shape having the same diameter as that of the adjusting member 52, and a bolt hole 56b is formed through the center of the spacer 56. The spacer 56 and the adjusting member 52 are secured together in a stacked state by screwing a bolt 55 through bolt holes 52a and 56b of the adjusting member 52 and the spacer 56 into a bolt hole 32c of the casing 32. For positioning the outer face of the casing 32 and the mounting face 56a of the spacer 56 in the rotational direction, a projection 32d formed on the casing 32 is interlocked with a recess 56c formed in the spacer 56, thereby fixing the spacer 56 to the casing 32 in a fixed positional relationship. The adjusting member 52 of the fourth embodiment has substantially the same structure as that of the adjusting member 52 of the first embodiment, but whereas the wedge angle of the adjusting member 52 of the first embodiment is 1.5°, the wedge angle of the adjusting member 52 of the fourth embodiment is 1.0°.

The reference plane P of the spacer 56 exhibits the same function as that of the reference plane P of the casing 32 of the first to third embodiments, 20 parts to be latched E2 are formed on a first base surface of the adjusting member 52, and engaging one of these 20 parts to be latched E2 with a latching part E1 of the spacer 56 enables the adjusting member 52 to be fixed relative to the casing 32.

Engaging the No. 1 part to be latched E2 of the adjusting member 52 with the latching part E1 results in the second base surface 54 of the adjusting member 52 sloping downward to the front by 1.0°, and rotating the adjusting member 52 through 180° so as to engage the No. 11 part to be latched E2 with the latching part E1 results in the second base surface 54 of the adjusting member 52 sloping upward to the front by 1.0°. That is, rotating the adjusting member 52 around the bolt 55 clockwise or counterclockwise through 180° changes the angle of the second base surface 54 through 10 stages from a state of sloping downward to the front by 1.0° to a state of sloping upward to the front by 1.0°, thus enabling adjustment with a pitch of 0.2°.

In this way, in the case where the reference plane P of the casing 32 is largely inclined, the inclination of the reference plane P is compensated for by mounting the spacer 56, thereby ensuring that the object detection axis Ar is adjusted precisely.

Although embodiments of the present invention are explained in detail above, the present invention can be modified in various ways without departing from the spirit and scope thereof.

For example, in the above-described preferred embodiments of the present invention, the vertical angle of the object detection axis Ar of the radar system Sr is adjusted to be horizontal, but it is also possible to adjust it so as to slope slightly upward or downward relative to the horizontal direction.

Furthermore, the object to be detected by the radar system Sr is not limited to a vehicle V and can include persons, objects installed on the road, and white lines on the road. The object detection system of the present invention is not limited to the millimeter wave radar system Sr and can include a laser radar system, a sonar, and a camera. When a laser radar system is used as the object detection system, it is appropriate for the reference reflector R to have the same structure as that of a reflector provided on a vehicle body rear part of an automobile.

Figure 27:
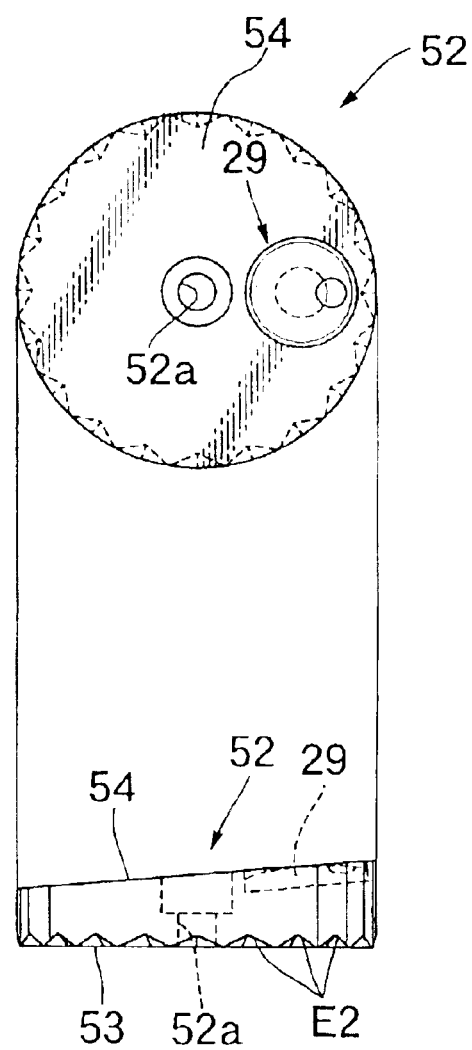
FIG. 27 is a plan view of a adjusting member according to a fifth embodiment, wherein the adjusting member integrally includes a level.

As shown in a fifth embodiment of FIG. 27, mounting a circular level 29 integrally on a second base surface 54 of a adjusting member 52 eliminates the need to install the level 29 on the second base surface 54, thereby improving convenience.

What is claimed is:

1. A method for adjusting a detection axis of an object detection system in which object detection means having a predetermined detection direction (Ar0) is fixed within a casing having a reference plane (P) on the outer face thereof, the method comprising the following steps:

detecting an angular difference between the predetermined detection direction (Ar0) and an object detection axis (Ar) of the object detection means in an initially fixed state of the object detection means relative to the casing;

fixing to the casing a adjusting member having a first base surface and a second base surface, between which a wedge shape is formed, the adjusting member being mountable in rotationally different positions on the reference plane (P) of the casing with the first base surface being a mounting surface, wherein the adjusting member is fixed, based on the angular difference between the predetermined detection direction (Ar0) and the object detection axis (Ar), at a rotational position wherein the direction of the second base surface coincides with the object detection axis (Ar) in a state wherein the adjusting member is mounted on the reference plane (P) of the casing; and adjusting the angle of the casing wherein a direction of the second base surface has a predetermined relationship relative to the predetermined detection direction (Ar0).

2. The method for adjusting a detection axis of an object detection system according to claim 1, wherein the adjusting member is disk-shaped and rotates freely around a mounting part provided in a middle thereof.

3. The method for adjusting a detection axis of an object detection system according to claim 2, wherein engaging a latching part (E1) provided on the reference plane (P) of the casing with a part to be latched (E2) provided on the first base surface of the adjusting member positions the adjusting member in a predetermined rotational position relative to the mounting part.

4. The method for adjusting a detection axis of an object detection system according to claim 3 wherein the adjusting member is positionable in a plurality of rotational positions by providing a plurality of at least one of the latching part (E1) and the part to be latched (E2).

5. The method for adjusting a detection axis of an object detection system according to claim 3 wherein the adjusting member is positionable in a plurality of rotational positions by providing a single one of either the latching part (E1) or the part to be latched (E2) and a plurality of the other one at equal intervals in a circumferential direction around the mounting part of the adjusting member.

6. The method for adjusting a detection axis of an object detection system according to claim 3 wherein the adjusting member is positionable in a plurality of rotational positions by providing a single one of either the latching part (E1) or the part to be latched (E2) and a plurality of the other at unequal intervals in a circumferential direction around the mounting part of the adjusting member.

7. The method for adjusting a detection axis of an object detection system according to any one of claims 1 to 6, wherein the predetermined detection direction (Ar0) is a horizontal direction and the direction of the second base surface coincides with the horizontal direction in the predetermined relationship.

8. The method for adjusting a detection axis of an object detection system according to claim 1, wherein the predetermined detection direction (Ar0) is a horizontal direction, and the adjusting member includes a level integrally provided on the second base surface.

9. The method for adjusting a detection axis of an object detection system according to claim 1, wherein a spacer including a mounting surface and the reference plane (P), between which a wedge shape is formed, is fixed wherein the mounting surface abuts against an outer face of the casing to adjust the angle of the reference plane (P) of the spacer relative to the object detection axis (Ar).

10. The method for adjusting a detection axis of an object detection system according to claim 9, wherein the spacer and the adjusting member are disk-shaped and secured together to the outer face of the casing via mounting parts provided in the middle thereof.

11. The method for adjusting a detection axis of an object detection system according to claim 10, wherein the mounting face of the spacer is interlocked with the outer face of the casing to position the mounting face in the rotational direction.

\* \* \* \* \*